(12) United States Patent
Kozisek

(10) Patent No.: US 8,068,450 B2
(45) Date of Patent: Nov. 29, 2011

(54) SYSTEM AND METHOD FOR PROVIDING AGGREGATED WIRELESS COMMUNICATIONS SERVICES

(75) Inventor: Steven E. Kozisek, Leawood, KS (US)

(73) Assignee: Embarq Holdings Company, LLC, Overland Park, KS (US)

( * ) Notice: Subject to any disclaimer, the term of this patent is extended or adjusted under 35 U.S.C. 154(b) by 726 days.

(21) Appl. No.: 11/656,775

(22) Filed: Jan. 23, 2007

(65) Prior Publication Data
US 2008/0175188 A1   Jul. 24, 2008

(51) Int. Cl.
*H04W 4/00* (2009.01)

(52) U.S. Cl. ....... 370/328; 455/410; 455/411; 455/3.01; 455/552.1; 455/557

(58) Field of Classification Search .................. 370/328; 713/150, 153; 455/410, 411, 3.01, 552.1, 455/556.1, 557
See application file for complete search history.

(56) References Cited

U.S. PATENT DOCUMENTS

| | | | |
|---|---|---|---|
| 7,117,526 B1* | 10/2006 | Short | 726/5 |
| 7,376,098 B2* | 5/2008 | Loeffler et al. | 370/329 |
| 7,409,201 B2* | 8/2008 | Maria et al. | 455/403 |
| 7,444,669 B1* | 10/2008 | Bahl et al. | 726/3 |
| 2006/0064497 A1* | 3/2006 | Bejerano et al. | 709/228 |
| 2007/0082654 A1* | 4/2007 | Hovnanian et al. | 455/410 |
| 2009/0022152 A1* | 1/2009 | Henry et al. | 370/389 |

* cited by examiner

*Primary Examiner* — Temica M Beamer
(74) *Attorney, Agent, or Firm* — SNR Denton US LLP

(57) ABSTRACT

A system and method for enabling users of wireless devices to increase wireless communication bandwidth may include a server in communication with multiple wireless access points. The server may execute software configured to enable a wireless device to communicate with multiple wireless access points of a network during a communications session. The software, in response to determining that the wireless device attempts to communicate with a wireless access point of the network, determines whether the user of the wireless device has a subscription to communicate with multiple wireless access points to aggregate bandwidth from the wireless access points, and enables the wireless device to access the network and communicate with the wireless access points if the user has the subscription agreement.

20 Claims, 4 Drawing Sheets

SYSTEM AND METHOD FOR PROVIDING AGGREGATED WIRELESS COMMUNICATIONS SERVICES

BACKGROUND

Wireless communications have become pervasive in recent years. At first, telecommunications provided cordless handsets to enable consumers to use a home telephone without being restricted by a telephone cord. Mobile telephones further provided freedom to consumers by enabling them to use a telephone while away from home. Finally, computers that were once attached to a wall socket to communicate over the Internet became wireless through the use of wireless routers and other wireless access points.

While wireless routers have enabled computer users to access the Internet with unprecedented freedom, bandwidth of these routers are relatively slow. Today's technology provides users with 50 megabit (MB) per second communications. However, these speeds are relatively slow when downloading large amounts of content, such as a movie.

A number of bandwidth expansion products have been developed to increase bandwidth to subscribers. One such product provides a subscriber with a device to aggregate bandwidth from local wireless routers. Essentially, communication with each local wireless router is performed in parallel.

One situation that has developed by wireless routers becoming so pervasive is non-subscribers accessing wireless routers and services being paid by neighbors. This situation arises when a subscriber does not password protect access to the wireless router. In the case of a non-subscriber accessing a subscriber's wireless router, this act is considered theft of wireless communications services. In the case where the subscriber knowingly allows for other non-subscribers to access the wireless router, such an act is generally prohibited by the service agreement between the service provider and the subscriber. The act of bandwidth pooling by non-resellers, such as residential consumers, is also generally considered a violation of the service agreement because non-subscribers or users other than the subscriber who owns the wireless router are provided access to the wireless routers and telecommunications services without paying a telecommunications carrier.

SUMMARY

To overcome the bandwidth and service agreement problems, the principles of the present invention provide for bandwidth aggregation within the terms of a subscriber agreement. To meet the terms of the subscriber agreement, a service provider may offer a subscriber agreement that enables the subscriber to have aggregated wireless services. The wireless services may be provided by wireless access points, such as wireless routers, that may be configured to have a private wireless communications interface and a public wireless communications interface. In one embodiment, a determination may be made as to whether a user of a wireless device is a subscriber of a wireless network when the user attempts to access the network via a residential wireless access point. A subscriber of the aggregated wireless services may utilize a wireless device, such as a personal computer or telephone, and communicate with other local wireless access points to achieve an aggregated bandwidth. In using the aggregated wireless services, a subscriber may log-on manually, semi-automatically, or automatically, and a visitor (i.e., a non-subscriber or subscriber without aggregation rights) may be authenticated to gain access to the wireless access point for aggregated usage.

One embodiment of a system for enabling users of wireless devices to increase wireless communication bandwidth includes a server in communication with multiple wireless access points. The server may execute software configured to enable a wireless device to communicate with multiple wireless access points of a network during a communications session. The software, in response to determining that the wireless device attempts to communicate with a wireless access point of the network determines whether the user of the wireless device has a subscription to communicate with multiple wireless access points to aggregate bandwidth from the wireless access points, and enables the wireless device to access the network and communicate with the wireless access points if the user has the subscription agreement.

One embodiment of a method for enabling users of wireless devices to increase wireless communications bandwidth includes determining that a wireless device attempts to communicate with a wireless access point of a network. A determination as to whether the user of the wireless device has a subscription agreement to communicate with multiple wireless access points of the network to aggregate bandwidth from the wireless access points may be made. The wireless device may be enabled to communicate with the wireless access points if the user has the subscription agreement.

BRIEF DESCRIPTION OF THE DRAWINGS

Illustrative embodiments of the present invention are described in detail below with reference to the attached drawing figures, which are incorporated by reference herein and wherein.

DETAILED DESCRIPTION OF THE DRAWINGS

Figure 1:
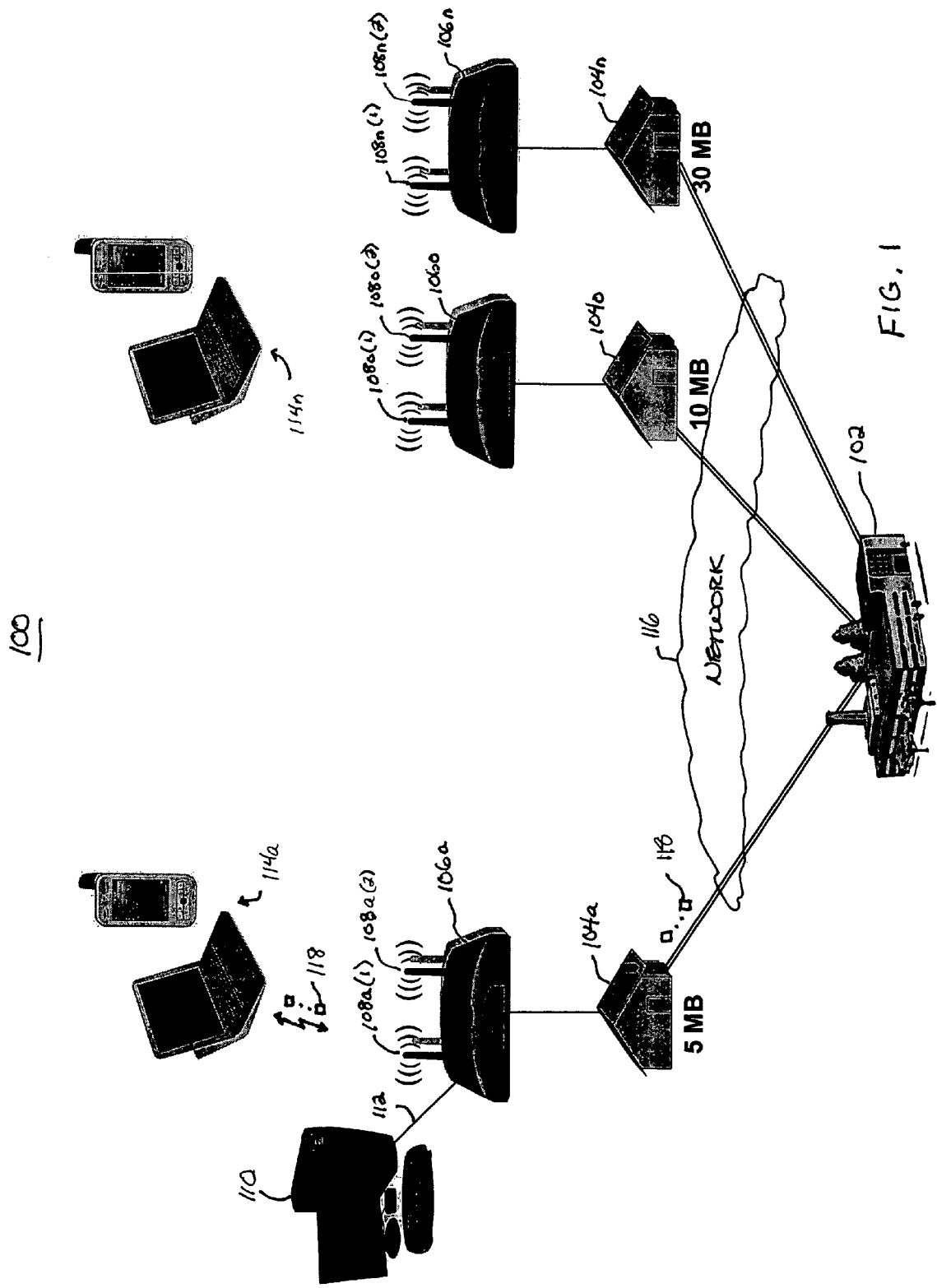
FIG. 1 is an illustration of a system for providing aggregated wireless communications services.

FIG. 1 is an illustration of a system 100 for providing aggregated wireless communications services. The system 100 includes a central office or remote terminal 102 of a wireless communications network service provider that enables subscribers to have broadband aggregated wireless communications services. The subscribers may access the broadband aggregated wireless communications services at residential locations 104*a*-104*n* (collectively 104), such as a house, via wireless access points 106*a*-106*n* (collectively 106). The wireless access points 106 may be a wireless router or any other wireless access point that enables a user to have wireless access to a network. A wireless access point 106*a* may include multiple antennas 108*a*(1)-108*a*(2) (collectively 108*a*) that are utilized to communicate with a user within the residential location 104*a* and user outside of the residential location 104*a*. A communications path (not shown), including a transceiver and other communications devices as understood in the art, may be included within the wireless access point 106a for communicating via each antenna 108a(1) and 108a(2). In one embodiment, the wireless access point 106a may communicate with a personal computer 110 or other device over a cable 112 using an Ethernet communications protocol or other communications protocol. In addition, a user may communicate with the wireless access point 106a using a wireless device 114a, such as a personal computer, mobile telephone, or other wireless device for communicating over a network 116 (e.g., the Internet).

In communicating with the wireless access point 106a, the wireless device 114a may wirelessly communicate using data packets 118 using a wireless communications protocol, such as WiFi, WiMax, or any other wireless communications protocol for communicating voice and/or data over the network 116. The data packets 118 may be communicated via the wireless access point 106a and over the network 116.

As understood in the art, individual users tend to use only a small fraction of available bandwidth, as bandwidth is not utilized when communications are not being conducted. Data packets tend to be burst for short periods of time. When data packets are not being communicated, there is available bandwidth.

In accordance with the principles of the present invention, the wireless access points 106 may have a private communications interface and a public wireless communications interface. In one embodiment, each of the private and public wireless communications interfaces may be in communication with respective antennas 108a(1) and 108a(2). Alternatively, both may be in communication with a single antenna 108a(1). The private wireless communications interface may be one that a subscriber at the residential location 104a may access, but no other subscribers may access. The public wireless communications interface may be an interface that both the subscriber located at the residential location 104a may use and a subscriber other than one located at the residential location 104a may utilize. In other words, any wireless devices 104a-104n (collectively 104) that are within communication range of one of the wireless access points 106 that has a public wireless communications interface may communicate with that wireless access point and utilize unused bandwidth. Of course, a subscriber who owns the wireless access point 106a may be given priority over other subscribers utilizing unused bandwidth of the wireless access point. For example, if the subscriber who owns the wireless access point 106a decides to download a movie from the network 116, that movie download would be given priority over other subscribers who are aggregating wireless communications by accessing the wireless access point 106a.

As shown, each of the residential locations is provided a certain bandwidth. More specifically, residential location 104a receives a 5 MB bandwidth, residential location 104o receives a 10 MB bandwidth, and residential location 104n receives a 30 MB bandwidth. These bandwidths are paid for by each of the respective subscribers, where the subscriber at residential location 104a may pay less for a 5 MB bandwidth than a subscriber at residential location 104n with a 30 MB bandwidth. If the subscriber at residential location 104a is within wireless communication range of the wireless access point 106o, the aggregated wireless communications for the subscriber at residential location 104a is potentially a 15 MB bandwidth (i.e., the sum of the 5 MB and 10 MB bandwidths) while communicating with both the wireless access points 106a and 106o. If the subscriber at residential 104o is in wireless communication range of wireless access points 106a and 106n, then the subscriber may have 45 MB bandwidth (i.e., the sum of the 5 MB, 10 MB, and 30 MB bandwidth), and if the subscriber at residential location 104n is in wireless communication range of the wireless access point 106o, then the subscriber at residential location 104n has a 40 MB bandwidth (i.e., the sum of the 10 MB and 30 MB bandwidth) while communicating with both wireless access points 106o and 106n.

Figure 2:
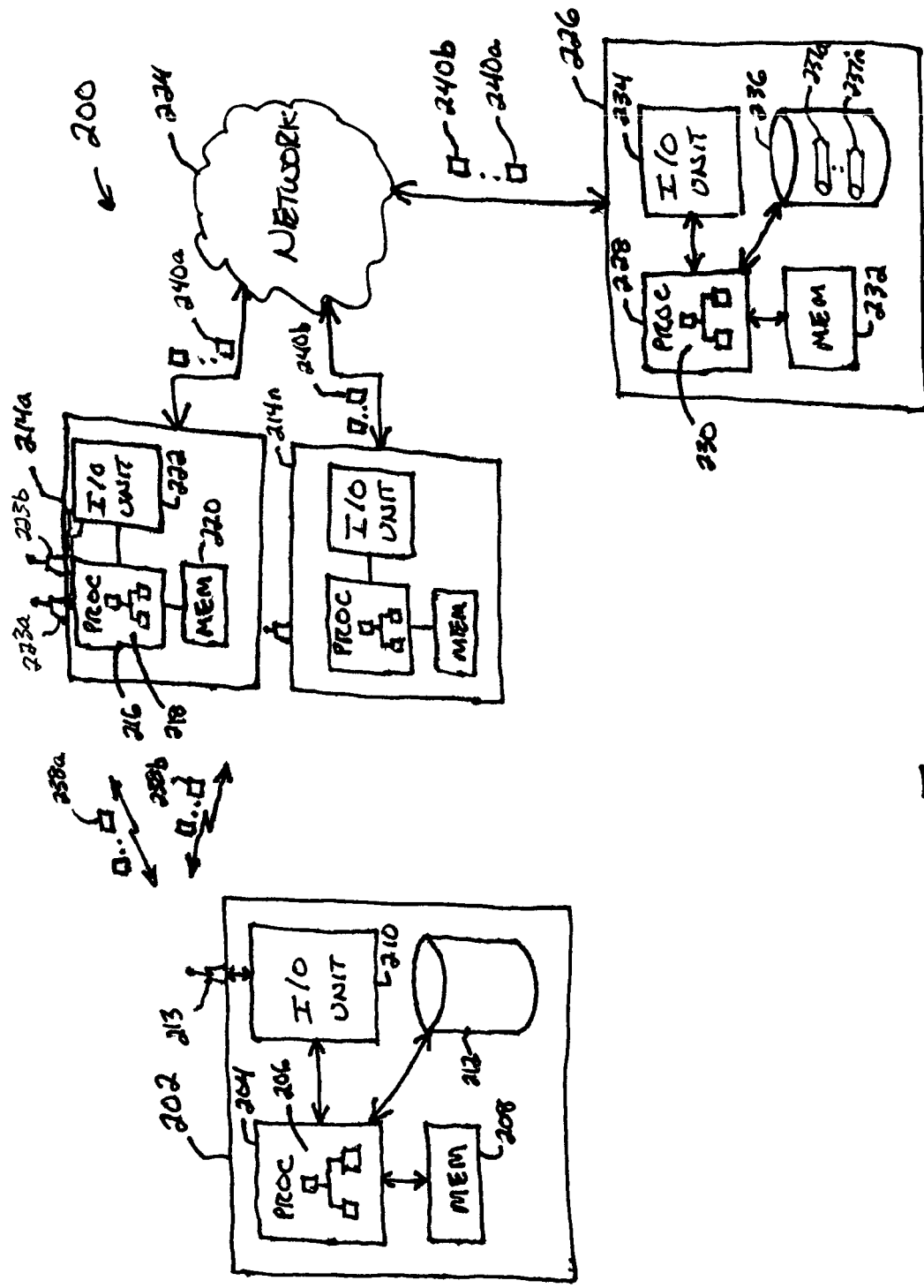
FIG. 2 is an illustration of a system showing components within the system for providing aggregated wireless communications.

FIG. 2 is an illustration of a system 200 showing components within the system for providing aggregated wireless communications. The system 200 may include wireless device 202 that may be a personal computer, laptop computer, telephone, game, or any other device that may utilize wireless communications. The wireless device 202 may include a processor 204 that executes software 206 that is utilized for providing functionality for a user of the wireless device and provides wireless communications, including aggregated wireless communications in accordance with the principles of the present invention, to enable the user to communicate with remote locations. The processor 204 may be in communication with a memory 208 that is used for storing data and executable software, input/output (I/O) unit 210 that performs communications with remote locations, and storage unit 212 that may store data for the wireless device 202. An antenna 213 may be in communication with the I/O unit 210 for performing wireless communications to remote devices.

A wireless access point 214a may include a processor 216 that executes software 218. The software 218 may provide for both private and public wireless interface communications. The processor 216 may be in communication with memory 220 and I/O unit 222. Antennas 223a and 223b may be in communication with the I/O unit 222 for providing both private and public wireless communications services to subscribers within range of the wireless access point 214a. The software 218 may be configured to enable owners of the wireless access point 214a to have unrestricted access to the wireless access point 214a and have priority for wireless communications with the wireless access point 214a over non-owners (i.e., other subscribers who are using the public wireless communications interface for aggregating wireless communications bandwidth) accessing the wireless access point 214a. The wireless access point 214a may be in communication with a network 224, such as a telecommunications network, Internet, or other network. In one embodiment, the network 224 is a public switched telephone network (PSTN).

A server 226, which may be operated by a telecommunications service provider or other service provider, may include a processor 228 that executes software 230. The processor 228 may be in communication with memory 232, I/O unit 234, and storage unit 236. Data repositories 237a-237n (collectively, 237) may be stored on the storage unit 236 and be utilized to store subscriber information of the service provider. In one embodiment, data stored in the data repositories 237 include subscribers who pay for aggregated wireless communications services, such that a subscriber may access multiple wireless access points 214a-214n to receive increased wireless communications bandwidth.

The software 230 may be configured to determine when a wireless device is attempting to access a wireless access point 214a to determine whether the wireless device is owned by the owner of the wireless access point. In the case of the wireless access point 214a having a private and public wireless communications interface, the determination may be made to determine whether the wireless device is attempting to access the private or public wireless communications interface. This determination may be made in conjunction with software executing on the wireless access point 214a. For example, software being executed by the wireless access point 214a may (i) generate a signal, including information representative of a wireless device (e.g., device number or IP address), in response to the wireless device attempting to communicate with the wireless access point 214a and (ii) communicate the signal to the server 226 for the software 230 to compare the information representative of the wireless device with the information stored in the data repositories 237 to determine whether the wireless device is owned or being operated by a subscriber of the network. Still yet, if the wireless device is not owned by the owner of the wireless access point 214a, then a determination may be made as to whether the user is a subscriber of the aggregated wireless network being serviced by the telecommunications service provider. A wireless device attempting to access the wireless access point may be indicative of the wireless device attempting to aggregate bandwidth or simply accessing the network without paying for the service, so the software may intercept and prevent such unauthorized access. If the user does not have a subscription for aggregated bandwidth services, then he or she may pay for limited access (see, FIGS. 4 and 5).

Figure 3:
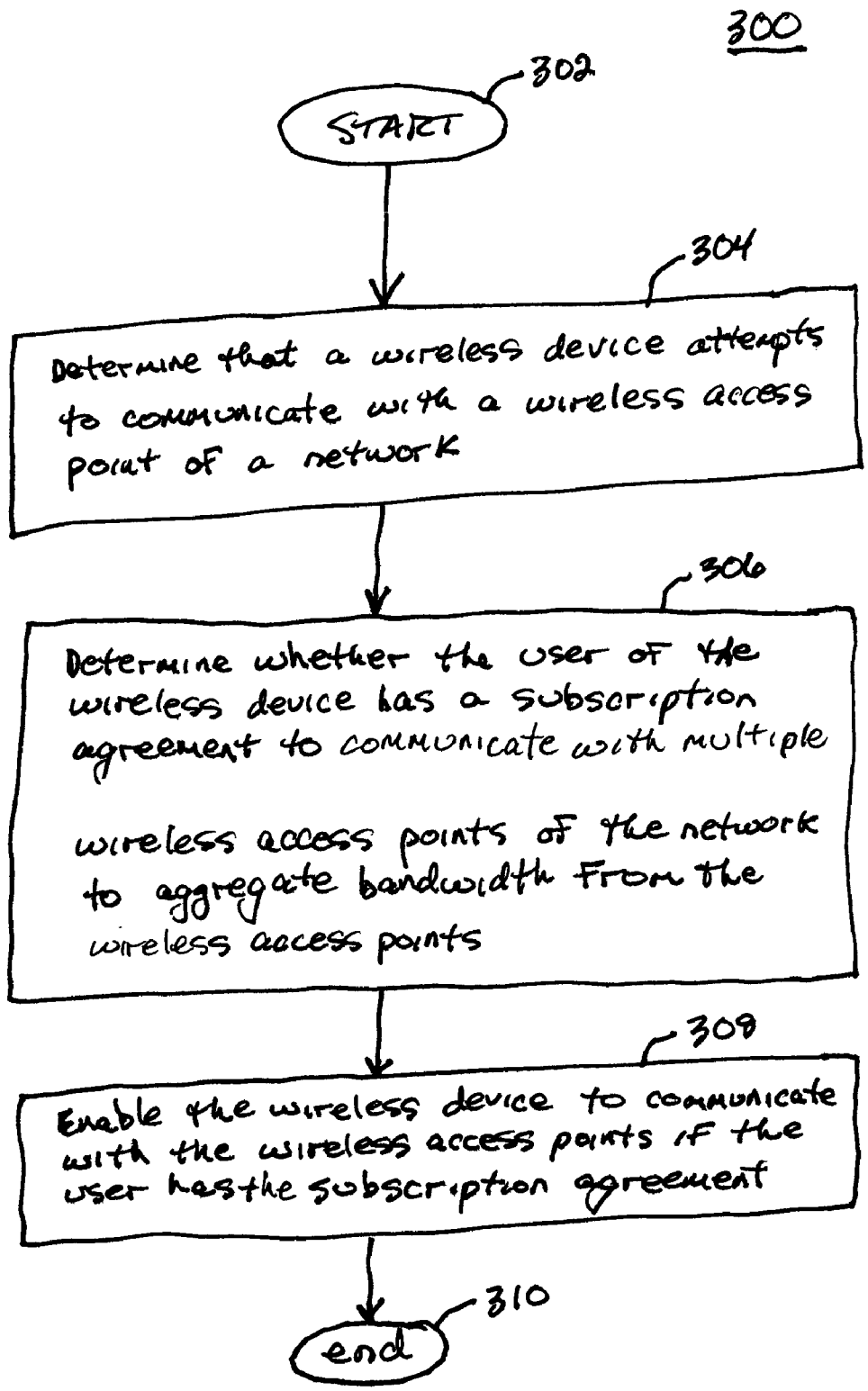
FIG. 3 is a flow diagram of an exemplary process for determining that a user is a subscriber of aggregated wireless communications services.

FIG. 3 is a flow diagram of an exemplary process 300 for determining that a user is a subscriber of aggregated wireless communications services. The process 300 starts at step 302. At step 304, a determination is made that a wireless device attempts to communicate with a wireless access point of a network. At step 306, a determination is made as to whether the user of the wireless device has a subscription agreement to communicate with multiple wireless access points of the network to aggregate bandwidth from the wireless access points. At step 308, the wireless device is enabled to communicate with the wireless access points if the user has the subscription agreement allowing for aggregated wireless communication services. The process may be implemented using software and/or hardware of a telecommunications service provider. The process ends at step 310.

Figure 4:
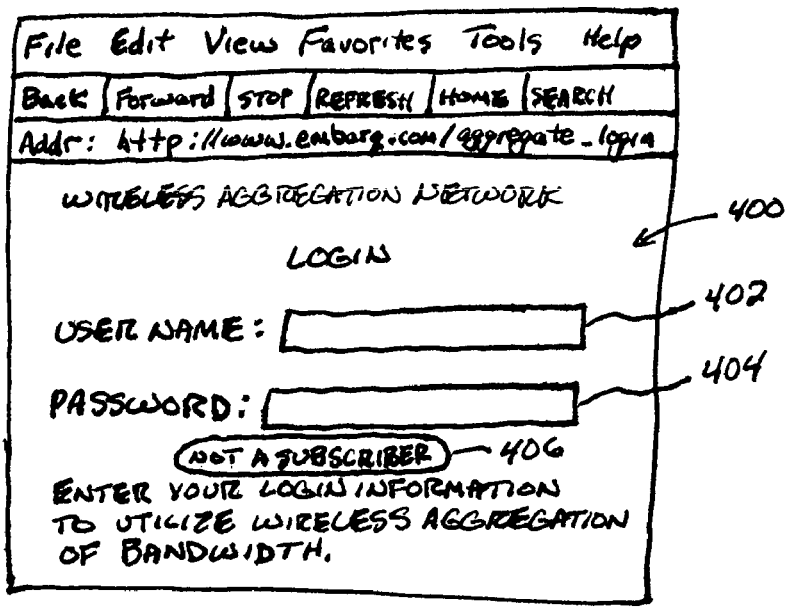
FIG. 4 is a screen shot of an exemplary log-in webpage for a user to access a network that provides aggregated wireless communications services.

FIG. 4 is a screen shot of an exemplary log-in webpage 400 for a user to access a network that provides aggregated wireless communications services. The webpage 400 may be generated and prompted to a user of a wireless device in response to attempting to access a wireless access point of the wireless aggregation network. The webpage 400 may request a user name and password input fields 402 and 404, respectively. If the user is not a subscriber of the wireless aggregation network then the user may select a soft-button 406 indicating that he or she is not a subscriber. In response, the user may be provided another webpage (FIG. 5) to receive an access pass to temporarily access the wireless aggregation network.

Figure 5:
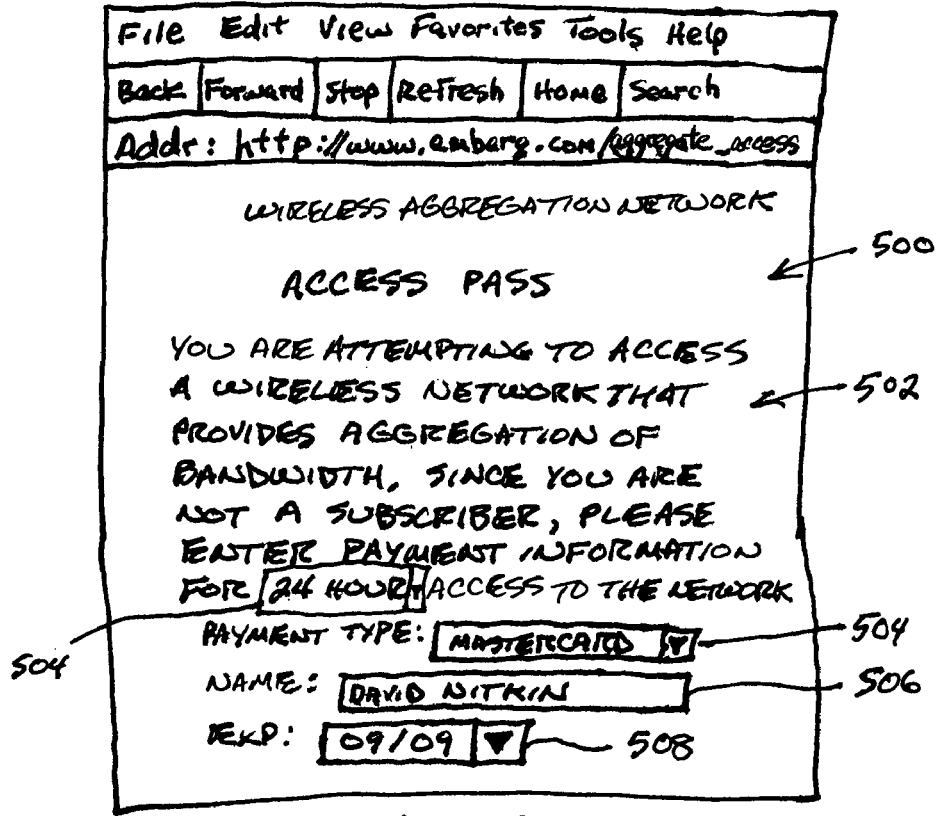
FIG. 5 is a screen shot of an exemplary webpage for enabling a user who is not a subscriber to temporarily pay for aggregated wireless communications services.

FIG. 5 is a screen shot of an exemplary webpage 500 for enabling a user who is not a subscriber to temporarily pay for aggregated wireless communications services. The webpage 500 may provide a message 502 that notifies the user that he or she is attempting to access the wireless aggregation network and that he or she is not a subscriber. The user may select a time period in a selectable element 504 that he or she wishes to have access to the wireless aggregation network. The user may enter payment type (e.g., credit card) in a selectable element 504, such as a pull-down menu, name in a text entry field 506, and expiration date of the payment type in a selectable element 508. Software at a central location (e.g., server 226 of FIG. 2) may store the user's information and enable the user utilizing a wireless device to have access to the wireless aggregation network for the selected time period. At the end of the time period, the user may be prompted with another webpage that allows the user to extend the time period or become a subscriber of the wireless aggregation network.

The previous detailed description is of a small number of embodiments for implementing the invention and is not intended to be limiting in scope. One of skill in this art will immediately envisage the methods and variations used to implement this invention in other areas than those described in detail. The following claims set forth a number of the embodiments of the invention disclosed with greater particularity.

What is claimed:

1. A system for enabling users of wireless devices to increase wireless communication bandwidth, said system comprising:
a server in communication with a plurality of wireless access points, said server executing software configured to enable a wireless device to simultaneously communicate with multiple wireless access points of a network during a communications session, the software, in response to determining that the wireless device attempts to communicate with a wireless access point of the network, determines whether the user of the wireless device has a subscription agreement to simultaneously communicate with multiple wireless access points to aggregate bandwidth from the wireless access points with which the wireless device is in communication, and enables the wireless device to access the network and communicate with the wireless access points if the user has the subscription agreement.

2. The system according to claim 1, wherein the wireless access points are wireless routers.

3. The system according to claim 2, wherein the wireless routers are configured to be utilized as residential properties of consumers.

4. The system according to claim 1, wherein the software, in determining whether the user of the wireless device has a subscription to communicate with multiple wireless access points to aggregate bandwidth, queries the wireless device to determine the user name and password of the user.

5. The system according to claim 4, wherein the query by the software to the wireless device causes the wireless device to prompt a user for the user name and password.

6. The system according to claim 1, wherein the wireless device is a personal computer.

7. The system according to claim 1, wherein the wireless device has priority when communicating with a home wireless access point of the user over other wireless devices communicating with the home wireless access point of the user.

8. The system according to claim 1, wherein the wireless access points are configured with a private communications interface and a public communications interface, the wireless device communicating with the public communications interface of at least one of the wireless access points.

9. The system according to claim 1, wherein the software is further configured to determine that the user is not a subscriber and query the wireless device to determine whether the user is willing to pay an access fee for communicating with multiple wireless access points to aggregate bandwidth.

10. The system according to claim 9, wherein the software is further configured to authorize an access fee payment by the user prior to enabling the wireless device to communicate with multiple wireless access points to aggregate bandwidth.

11. A method for enabling users of wireless devices to increase wireless communications bandwidth, said method comprising:
determining that a wireless device attempts to communicate with a wireless access point of a network;
determining whether the user of the wireless device has a subscription agreement to simultaneously communicate with multiple wireless access points of the network to aggregate bandwidth from the wireless access points with which the wireless device is in communication; and enable the wireless device to simultaneously communicate with the wireless access points if the user has the subscription agreement.

12. The method according to claim 11, further comprising receiving a signal from a wireless access point indicative of a wireless device attempting to access the network, the wireless access point being located at a residential property.

13. The method according to claim 12, wherein receiving a signal from a wireless access point includes receiving a wireless signal from a wireless router.

14. The method according to claim 11, further comprising querying the wireless device to determine a user name and password of the user.

15. The method according to claim 14, wherein querying the wireless device causes the wireless device to prompt the user for the user name and password.

16. The method according to claim 11, wherein determining that a wireless device attempts to communicate with a wireless access point includes determining that a personal computer attempts to communicate with a wireless access point.

17. The method according to claim 11, further comprising prioritizing communications of the wireless device when communicating with a home wireless access point of the user over other wireless devices communicating with the home wireless access point of the user.

18. The method according to claim 11, further comprising receiving communications from the wireless device from a public communications interface of at least one of the wireless access points having a private communications interface and a public communications interface.

19. The method according to claim 11, further comprising:
determining that the user is not a subscriber; and
querying the wireless device to determine whether the user is willing to pay an access fee for communicating with multiple wireless access points to aggregate bandwidth.

20. The method according to claim 19, further comprising authorizing an access fee payment by the user prior to enabling the wireless device to communicate with the wireless access points to aggregate bandwidth.

* * * * *